United States Patent
Smith et al.

(10) Patent No.: US 9,684,227 B1
(45) Date of Patent: Jun. 20, 2017

(54) PROTECTIVE CONTAINER FOR A 360 DEGREE CAMERA AND METHOD OF FORMING SAME

(71) Applicant: VSN TECHNOLOGIES, INC., Fort Lauderdale, FL (US)

(72) Inventors: Sybren D. Smith, Plantation, FL (US); Raymond Glenn Dubois, Jr., Palm City, FL (US); William H. Robertson, Jr., Fort Lauderdale, FL (US)

(73) Assignee: HOYOS VSN CORP., San Juan, PR (US)

( * ) Notice: Subject to any disclaimer, the term of this patent is extended or adjusted under 35 U.S.C. 154(b) by 0 days.

(21) Appl. No.: 14/690,710

(22) Filed: Apr. 20, 2015

(51) Int. Cl.
| | |
|---|---|
| *G03B 17/12* | (2006.01) |
| *G03B 37/00* | (2006.01) |
| *G02B 27/00* | (2006.01) |
| *H04N 5/225* | (2006.01) |
| *H04N 5/232* | (2006.01) |
| *G02B 3/06* | (2006.01) |

(52) U.S. Cl.
CPC ............... *G03B 17/12* (2013.01); *G02B 3/06* (2013.01); *G02B 27/0006* (2013.01); *G03B 37/00* (2013.01); *H04N 5/2252* (2013.01); *H04N 5/2254* (2013.01); *H04N 5/23238* (2013.01)

(58) Field of Classification Search
CPC ............. H04N 5/23238; H04N 5/3415; H04N 5/2252; H04N 5/2254; G02B 13/06; G02B 3/06; G02B 27/0006; G03B 17/12; G03B 37/00
USPC ....................................................... 396/529
See application file for complete search history.

(56) References Cited

U.S. PATENT DOCUMENTS

| | | | |
|---|---|---|---|
| 6,449,103 B1* | 9/2002 | Charles | G02B 13/06 359/366 |
| 2006/0268109 A1* | 11/2006 | Miyoshi | G06F 3/0325 348/143 |
| 2010/0066809 A1* | 3/2010 | Cormack | H04N 7/185 348/36 |

* cited by examiner

*Primary Examiner* — Rochelle-Ann J Blackman
(74) *Attorney, Agent, or Firm* — Patents on Demand P.A.; Brian K. Buchheit; Scott M. Garrett

(57) ABSTRACT

A housing assembly for a panoramic camera provides a protective housing that the camera can be placed in, and removed from, and which substantially reduces or eliminates undesirable second order reflections that would otherwise occur due to the presence of the additional optical layers of a transparent housing member and the gap between the transparent housing member and the cylindrical lens of the camera. Sealing members form a seal such that the concentric gap between the transparent housing member and the cylindrical lens can be filled with transparent liquid, thereby changing the optical properties of the system formed by the cylindrical lens, gap, and transparent housing member.

20 Claims, 4 Drawing Sheets

PROTECTIVE CONTAINER FOR A 360 DEGREE CAMERA AND METHOD OF FORMING SAME

FIELD OF THE DISCLOSURE

The present disclosure relates generally to 360 degree camera systems, and more particularly to protective housings for 360 degree camera systems.

BACKGROUND

Panoramic cameras capture a view that, when viewed by a human, would require a person to pan their vision in order to see all that is captured in the image, were the person at the location of the camera. Some panoramic cameras are capable of capturing a 360 degree view. A 360 degree camera captures an image that includes a 360 degree view around the camera, producing a "cylindrical" panoramic image. Some camera systems produce a similar result by using multiple image sensors arranged to capture a segment of a 360 degree view, and the resulting separate images are stitched together, but a 360 degree camera refers to a system where a single image sensor is used, and light is reflected into the image sensor using a 360 degree reflector arrangement. Typically the image sensor is mounted under a domed reflector which reflects light up to a flat reflector down through an aperture in the peak of the domed reflector to the image sensor. To support this arrangement a substantially cylindrical transparent lens housing member is mounted concentrically with the reflectors and image sensor. The lens housing member therefore becomes part of the optical structure of the system. As a result, reflection and refraction of light passing through the lens housing member can produce optical artifacts that have to be dealt with. Techniques such as image processing, selecting material for the lens housing with optimized optical properties, and shaping the lens housing can substantially reduce the optical artifacts that would otherwise be introduced into the 360 degree image.

Given that the lens housing member is a critical element of the optical system, however, and not one that may be easily replaceable, and given that it may be desirable to use a 360 degree camera in rugged environments where the lens housing member can be scratched or otherwise optically compromised, it is desirable to protect the lens housing member and the 360 degree camera in general. Simply placing a transparent member around the 360 degree camera, however, can cause more problems with optical aberrations due to the air gap between the transparent cover and the lens housing member, and the additional transparent cover can produce additional reflections.

Accordingly, there is a need for means by which a 360 degree camera can be protected from damage when used in rugged environments that minimizes or eliminates additional optical aberrations from being introduced into images produced by the 360 degree camera due to the presence of the protective member.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
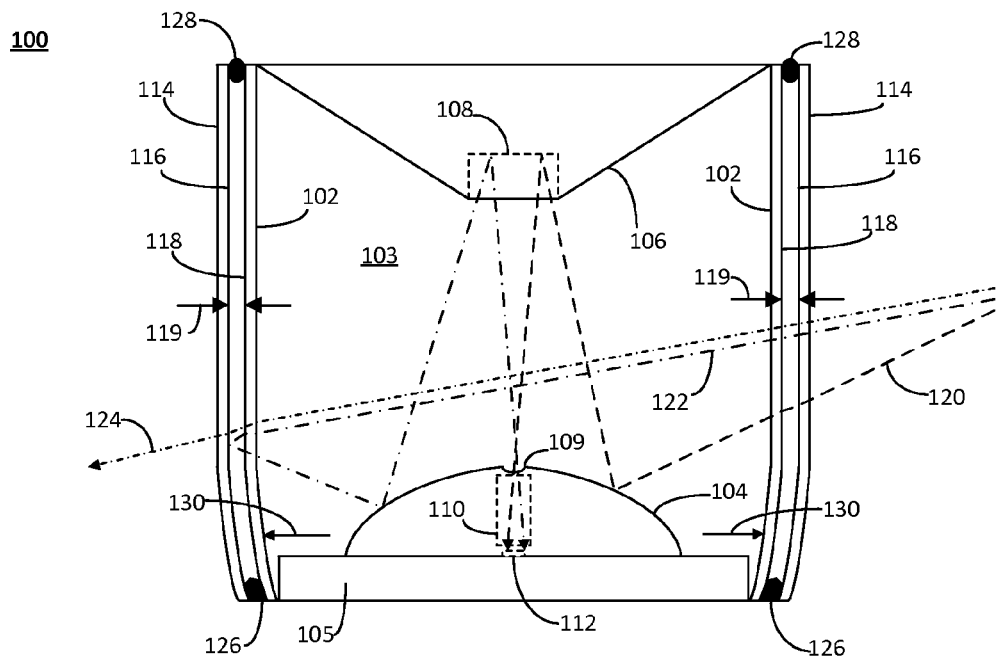
FIG. 1 is a side view of a portion of a 360 degree camera and a housing assembly for the 360 degree camera, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments of the disclosure include a housing assembly for a panoramic camera that reduces reflections of light incident on the transparent cylindrical housing member of the housing assembly so as to minimize the effect of reflections on the resulting images produces by the panoramic camera when housed inside the housing assembly. The housing assembly provides protection for the panoramic camera and particularly the cylindrical lens of the panoramic camera. The housing assembly arranges the transparent cylindrical housing member around the cylindrical lens of the panoramic camera such that there is a gap between the inner surface of the transparent cylindrical housing member and the outer surface of the cylindrical lens of the panoramic camera. The housing assembly seals the upper and lower boundaries of the gap so as to allow the gap to be filled with a transparent liquid, such as water. The transparent liquid, having a higher index of refraction reduces the change in angle of refraction of light rays passing through the gap, which reduces the ability of light to reach a critical reflection angle, thereby reducing the intensity of reflections.

Accordingly, some embodiments include a housing assembly for a panoramic camera that includes a transparent cylindrical housing member sized to accommodate a cylindrical lens of the panoramic camera with a concentric gap between an inner surface of the transparent cylindrical housing member and an outer surface of the cylindrical lens. The housing assembly can further include a bottom sealing member that forms a seal between a bottom of the transparent cylindrical housing member and a bottom of the cylindrical lens, and a top sealing member that forms a seal between a top of the transparent cylindrical housing member and a top of the cylindrical lens. The transparent cylindrical housing member, bottom sealing member, and top sealing member are removable so as to allow placement of the panoramic camera into, and removal from the housing assembly as desired by a user of the panoramic camera. The sealing members allow liquid to be introduced into the gap so as to fill or substantially fill the gap so as to minimize the effect of reflections on the images produced by the panoramic camera.

Figure 2:
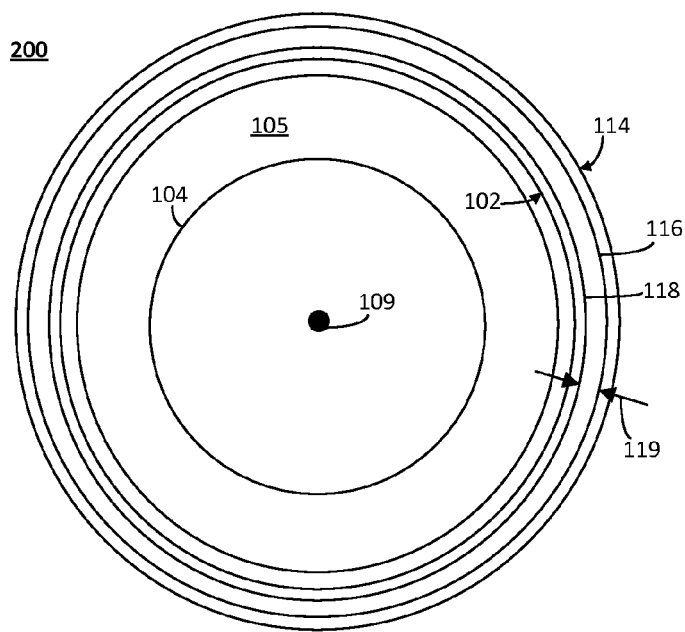
FIG. 2 is a top sectional view of a portion of a 360 degree camera and a housing assembly for the 360 degree camera, in accordance with some embodiments.

FIG. 1 is a side view 100 of a portion of a 360 degree camera and a housing assembly for the 360 degree camera, in accordance with some embodiments. A 360 degree camera is one example of a panoramic camera where light can potentially enter at one side without being incident on the image sensor, but then reflect off portion of the lens system and then enter the image sensor. The 360 degree camera uses a single photo or image sensor to capture an image produced from a 360 degree view to produce a 360 degree image, rather than using multiple image sensors oriented in different directions to produce independent images that are then "stitched" together in post-processing to produce a 360 degree image. Using a single image sensor and receiving light from a 360 degree view through a cylindrical lens results in image issues not present in multi-sensor (or multi-camera) panoramic systems. FIG. 2 is a top sectional view 200 of a portion of a 360 degree camera and a housing assembly for the 360 degree camera as shown in FIG. 1, in accordance with some embodiments.

In the views 100, 200 the cylindrical lens 102 of the 360 degree camera is disposed within a transparent cylindrical housing member 114 of the housing assembly. A concentric gap 119 is formed between an outer surface 118 of the cylindrical lens 102 and an inner surface 116 of the transparent cylindrical housing member 114. The concentric gap 119 is sealed at the bottom by a bottom sealing member 126, which can be, for example, an O-ring or other suitably compliant member that can be compressed to form a liquid seal. Likewise, the top of the concentric gap 119 can be sealed at the top by a top or upper sealing member 128. Generally, the 360 degree camera is placed into the housing assembly such that the bottom of the gap 119 is sealed, whereupon the user can fill the gap 119 with a transparent fluid, such as water. Once the gap 119 is filled with liquid, the top sealing member can be put in place to seal the top of the gap 119.

The 360 degree camera includes the cylindrical lens 102, which, in addition to being a lens, supports an upper portion 106 of a reflector assembly. The upper portion 106 includes a generally inverted conic member that is blackened to attenuate undesired reflections and other errant light rays, and holds a flat mirror 108 in a recess in the center of the inverted conic section. The flat mirror 108 reflects light into an aperture 109 in a domed reflector 104 on a bottom portion 105 of the reflector assembly. The domed reflector 104 is a highly polished dome-shaped reflector that reflects light that passes through the cylindrical lens 102 up to the flat mirror 108. Light reflected by the flat mirror 108 into the aperture 109 passes through an optical lens system 110 that focuses light onto an image sensor 112. The image sensor can be, for example, a complementary metal oxide semiconductor (CMOS) image sensor, a charge coupled device (CCD) image sensor, or any other electrically operated image sensor. The cylindrical lens 102 can be made of a suitable transparent material, such as acrylic, and can form a gas-tight seal between the upper portion 106 and the lower portion 105 such that the interior space 103 can be purged of air and filled with an inert gas, such as nitrogen, to exclude moisture from being trapped inside the 360 degree camera's optical system.

To illustrate how the reflector system works, a first ray trace 120 is shown passing through the transparent cylindrical housing member 114 of the housing assembly, the concentric gap 119, and the cylindrical lens 102 and being incident upon the domed reflector 104 where it is reflected up to the flat mirror 108 and down to the image sensor 112 through the aperture 109 and lens assembly 110. A second ray 122 from approximately the same origin as ray 120, illustrating a reflection when the concentric gap 119 is filled with air, initially passes over the domed reflector 104, but is incident on the other side of the transparent cylindrical housing member 114, where it is substantially reflected. The reflection occurs because of the difference in the index of refraction of the cylindrical lens 102, and the air in the concentric gap 119 causing the ray to refract and reach enough of an angle to cause a significant reflection. The ray 122, after reflecting off the inner surface of the transparent cylindrical housing member 114, is then incident upon the domed reflector 104 where it is reflected to the flat mirror 108 and down into the image sensor 112. A third ray 124 illustrates the effect of filling the concentric gap 119 with a transparent liquid. Since the index of refraction of the liquid is closer to that of the material of the cylindrical lens than is that of air, the ray 124 is refracted less, and thus does not cause a significant reflection, passing substantially through the other side of the transparent cylindrical housing member 114.

In some embodiments it has been found to be optically beneficial to have a bottom portion of the cylindrical lens 102 have a decreasing diameter 130 towards the bottom of the cylindrical lens 102. In particular, this design reduces first order reflections when the 360 degree camera is used without the housing assembly. Accordingly, it is contemplated in some embodiments that the transparent cylindrical housing member 114 can be designed to follow the resulting inward curve of the cylindrical lens 102 towards the bottom of the cylindrical lens 102 so as to maintain a consistent gap width of the concentric gap 119.

Figure 3:
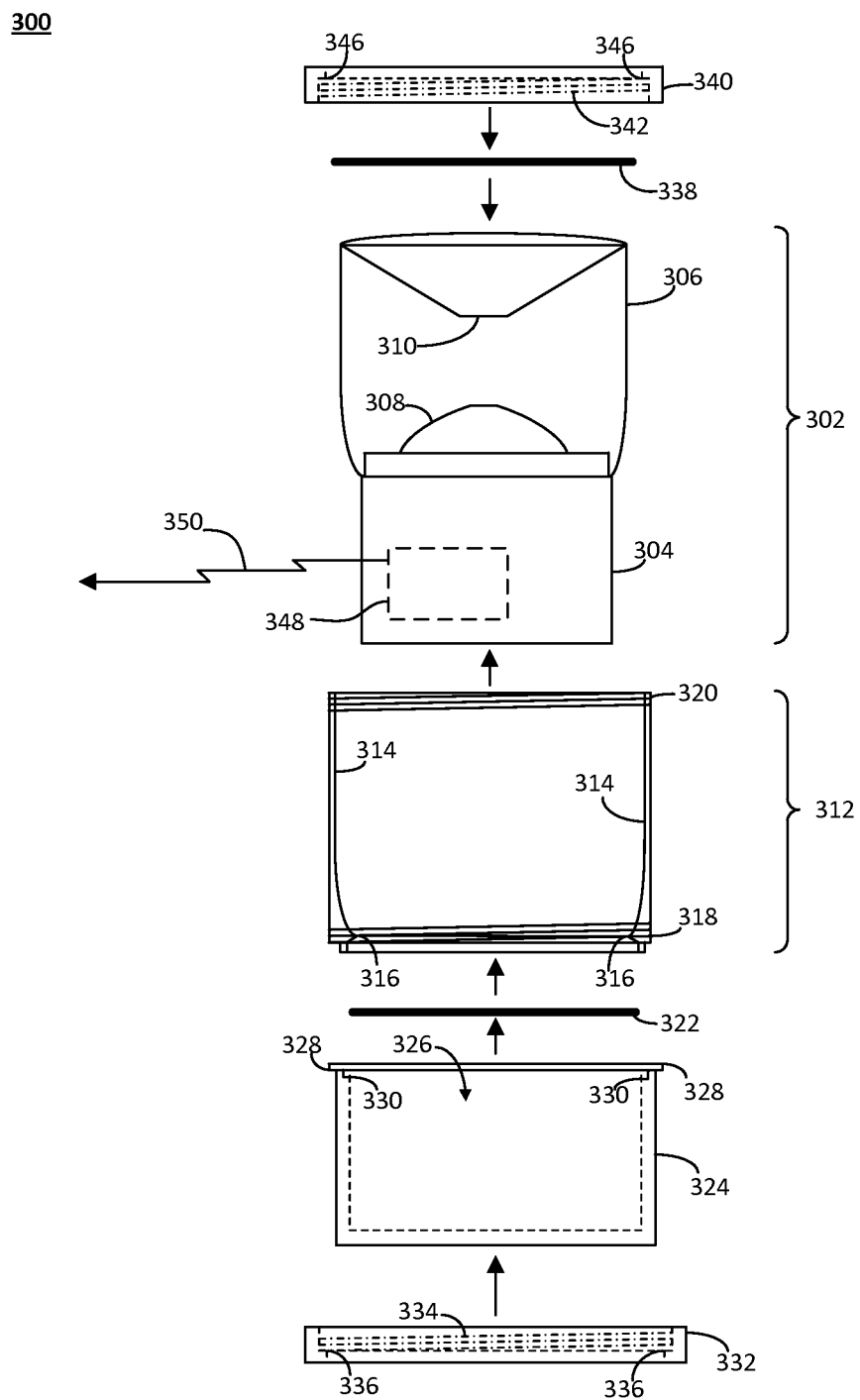
FIG. 3 is a an exploded side view of a housing assembly for a 360 degree camera, in accordance with some embodiments.
Figure 4:
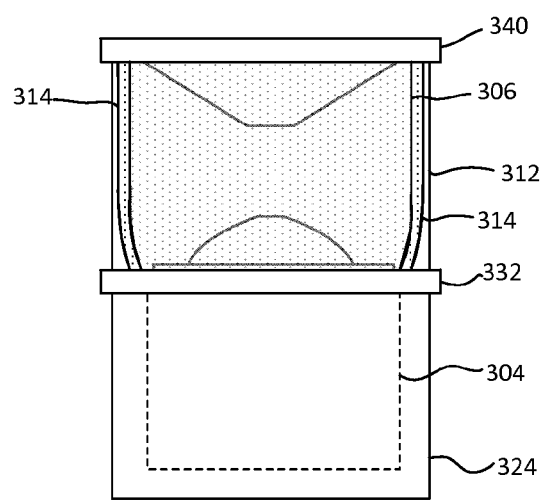
FIG. 4 is a side view of a housing assembly for a 360 degree camera when assembled around a 360 degree camera, in accordance with some embodiments.

FIG. 3 is a an exploded side view 300 of a housing assembly for a 360 degree camera, in accordance with some embodiments. All of the components illustrated here are substantially cylindrical or annular shaped when viewed from above. FIG. 4 is a side view 400 of the housing assembly of FIG. 3 for a 360 degree camera when assembled around a 360 degree camera, in accordance with some embodiments. The 360 degree camera 302 includes a cylindrical lens 306, a domed reflector 308, and a flat mirror or reflector in a recess 310 of an upper portion of a reflector assembly. The domed reflector 308 and cylindrical lens 306 are mounted on a base portion 304 which contains image processing circuitry, and power circuit (which can include a battery holder). In some embodiments the base portion can include a wireless transceiver 348 that communicates via electromagnetic waves 350 that are controlled according to a wireless communication interface protocol, as is known. The wireless transceiver 348 allows the 360 degree camera 302 to be remotely controlled, as well as to transmit images and video to remote devices.

The housing assembly includes a transparent cylindrical housing member 312 that is formed of a transparent, clear material, such as acrylic (i.e. poly(methyl methacrylate)), or other suitable transparent thermoplastic. The transparent cylindrical housing member 312 protects the cylindrical lens 306 of the 360 degree camera 302 while allowing most light to reach the image sensor of the 360 degree camera. The transparent cylindrical housing member 302 is sized to accommodate the cylindrical lens 306 within the transparent cylindrical housing member such that there is a concentric gap between the outer surface of the cylindrical lens 306 and an inner surface 314 of the transparent cylindrical housing member 312. To assemble the housing assembly, the transparent housing member 312 can be placed over the base 304 of the 360 degree camera 302 into coarse alignment with the cylindrical lens 306 of the 360 degree camera 302. A bottom sealing member 322, which can be a compliant member such as an O-ring, can be placed into alignment with the bottom of the concentric gap formed between the cylindrical lens 306 and the transparent cylindrical housing member 312. A base portion 324 can include a cavity 326 for accommodating the base 304 of the 360 degree camera 302. The base portion can have an inner lip 330 for accommodating the bottom sealing member 322 into alignment with the bottom of the gap between the cylindrical lens 306 and the transparent cylindrical housing member 312. An annular compression ring 322 is threaded with threads 334 that engage corresponding threads 318 on the transparent cylindrical housing member 312, and includes an inner lip 336 that bears against an outer lip 328 of the base portion 324. By turning the annular compression ring 332 the transparent cylindrical housing member 312 is pulled down onto the bottom sealing member 322, bearing on a lip 316 on the inside of the transparent cylindrical housing member 312, compressing the bottom sealing member and pressing it into contact with the bottom of the cylindrical lens 306 to form a seal, and thereby properly aligning the transparent cylindrical housing member 312 with the cylindrical lens 306 to form the concentric gap.

Once bottom of the gap is sealed, it can be filled with a transparent liquid. Upon filling the concentric gap with the transparent liquid the top of the gap can be sealed using a top sealing member 338 and a top portion 340 that can be similar to annular compression ring 332. The top portion 340 can have threads 342 on an inside of the top portion 340 that engage corresponding threads 320 on the top of the transparent cylindrical housing member 312. An inner lip 346 can bear against the top sealing member 338 to cause it to compress across the gap at the tops of the cylindrical lens 306 and the transparent cylindrical housing member 312 to seal the liquid in the gap. The assembled housing assembly with the 360 degree camera 302 inside, and with the transparent liquid filling the gap is shown in FIG. 4. The liquid protects the exterior of the cylindrical lens from scratches due to dust or other debris, and changes the refraction index of the gap so as to reduce or minimize, if not substantially eliminate the second order reflections caused by light passing through the cylindrical lens and reflecting off the far side (relative to where the light source) of the assembly. It will be appreciated that the housing assembly therefore allows the 360 degree camera to be easily placed in, and removed from the housing assembly.

Figure 5:
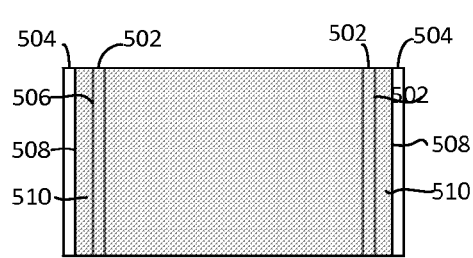
FIG. 5 is a side view of a housing assembly for a 360 degree camera where the gap between the housing assembly and the 360 degree camera is filled with a colored transparent liquid, in accordance with some embodiments.

FIG. 5 is a side view 500 of a section of the housing assembly for a 360 degree camera where the gap 510 between the transparent cylindrical housing member 504 of the housing assembly and the cylindrical lens 502 of the 360 degree camera is filled with a colored transparent liquid, in accordance with some embodiments. The gap 510 is formed between the inner surface 508 of the transparent cylindrical housing member 504 and the outer or exterior surface 506 of the cylindrical lens 502. The colored transparent liquid can be used for optical filtering of selected color/wavelength of light or to simply introduce color into the images captured by the 360 degree camera. Depending on the liquid used, some color filtering can occur. For example, water weakly absorbs red light. A weak dye can be added to counter this effect to compensate for the hue shift that would otherwise occur.

Figure 6:
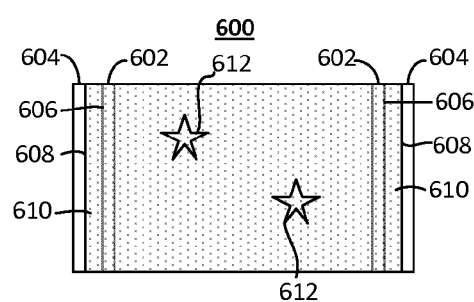
FIG. 6 is a side view of a housing assembly for a 360 degree camera where the gap between the housing assembly and the 360 degree camera is filled with optically significant matter suspended in a transparent liquid, in accordance with some embodiments.

FIG. 6 is a side view 600 of a section of the housing assembly for a 360 degree camera where the gap 610 between the transparent cylindrical housing member 604 of the housing assembly and the cylindrical lens 602 of the 360 degree camera is filled with transparent liquid that includes optically significant matter 612, in accordance with some embodiments. The gap 610 is formed between the inner surface 608 of the transparent cylindrical housing member 604 and the outer or exterior surface 606 of the cylindrical lens 602. The optically significant matter 612 can be, for example, translucent or opaque elements suspended in the liquid in the gap for creating effects on the captured image. In some embodiments the transparent liquid can include flakes of reflective matter suspended in the liquid, or which can be distributed in the liquid by manual agitation of the liquid (i.e. shaking the housing assembly).

Figure 7:
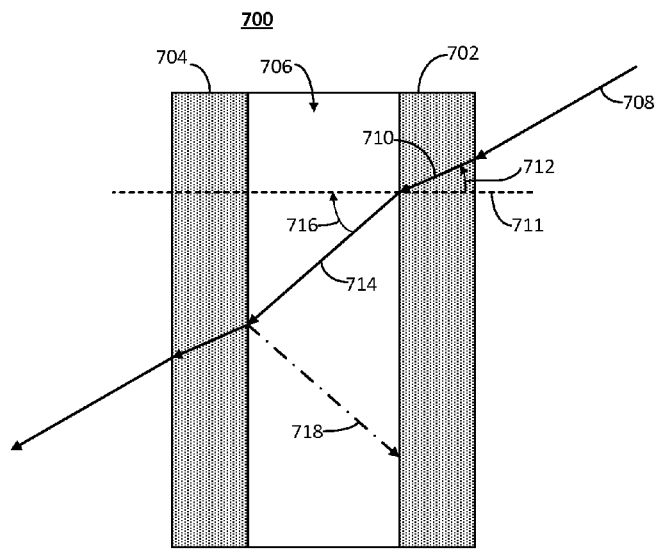
FIG. 7 is a side sectional view of a gap between a transparent cylindrical housing member of a housing assembly and a cylindrical lens of a 360 degree camera where the gap is filled with air.
Figure 9:
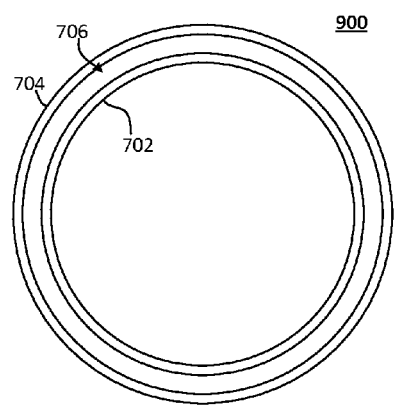
FIG. 9 is a top sectional view of a gap between a transparent cylindrical housing member of a housing assembly and a cylindrical lens of a 360 degree camera as shown in FIGS. 7-8.

FIG. 7 is a side sectional view 700 of a gap 706 between a transparent cylindrical housing member 704 of a housing assembly and a cylindrical lens 702 of a 360 degree camera where the gap 706 is filled with air, prior to filling the gap 706 with a transparent liquid. FIG. 9 shows a top view of the arrangements of FIGS. 7 & 8. A light ray 708 passes through the interior of the cylindrical lens 702 (e.g. 103 of FIG. 1) having already passed through the near side (relative to the light source) of the housing assembly and cylindrical lens 702, but was not incident on the domed reflector (e.g. 104 of FIG. 1). Accordingly the ray 708 is incident first on an inner surface of the cylindrical lens 702, where it is first refracted by the change in index of refraction in ray segment 710. The ray passes through the cylindrical lens 702 at a first angle 712 relative to a line 711 normal to the cylindrical lens 702. The ray 708 exits the cylindrical lens 702 and enters the gap 706, being refracted again in ray segment 714 due to the change in index of refraction at a second angle 716. The second angle 716 can be substantially greater than the first angle 712, and sufficient to be close to the critical angle for total reflection, creating a reflection ray 718 then can pass back through the cylindrical lens and reflect off the domed reflector, producing a reflection artifact in the image produced by the 360 degree camera.

Figure 8:
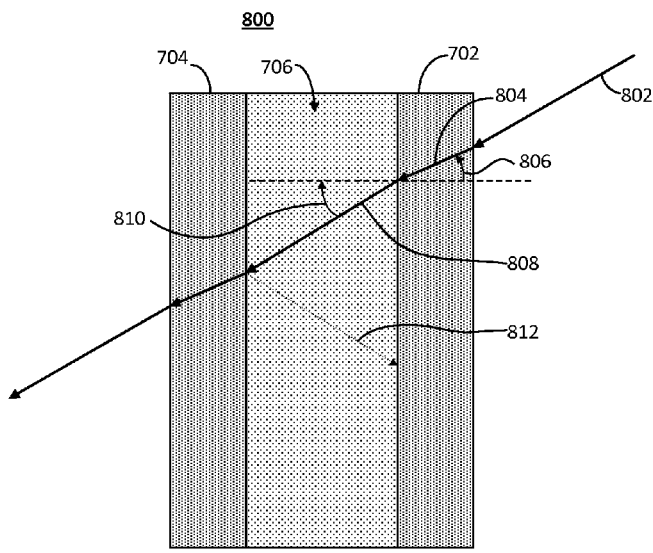
FIG. 8 is a side sectional view of a gap between a transparent cylindrical housing member of a housing assembly and a cylindrical lens of a 360 degree camera where the gap is filled with transparent liquid, in accordance with some embodiments.

FIG. 8 is a side sectional view 800 of a gap 706 between a transparent cylindrical housing member 704 of a housing assembly and a cylindrical lens 702 of a 360 degree camera where the gap 706 is filled with transparent liquid, in accordance with some embodiments. The assembly is identical to that of FIG. 7, with the addition of the transparent liquid in the gap 706, which is facilitated by the gap 706 being sealed at the bottom of the gap 706. A ray light ray 802, as with light ray 708, has passed through the cylindrical lens 702 of the 360 degree camera at an opposite side of form that shown in view 800 (note, the opposite side is not shown). The ray 802 does not strike the domed reflector of the 360 degree camera, and so is not initially reflected into the image sensor. The ray 802 passes through the cylindrical lens at ray segment 804, at a first angle 806, which, assuming ray 802 is at the same angle as ray 708 to the cylindrical lens 702, is the same the first angle 712 of FIG. 7. However, when the ray 802 exits the cylindrical lens 702 and enters the liquid filled gap 706, the second angle 810 is less than the second angle 716 of FIG. 7 because the index of refraction of the liquid is closer to the index of refraction of the material of the cylindrical lens 702, in accordance with Snell's Law. As a result, ray segment 808 is incident upon the transparent cylindrical housing member 704 at less of an angle, and the resulting reflection ray 812, if any, is substantially diminished in intensity compared to ray segment 718. Accordingly, the presence of the liquid significantly reduces reflections that would otherwise be present in images produced by a 360 degree camera housing in a protective housing with only an air gap between the transparent outer housing member and the cylindrical lens of the 360 degree camera.

The embodiments of the disclosure provide several benefits. The cylindrical lens of a 360 degree camera is a critical part of the optical system of the camera. It can also be a critical part of the structural design of the camera where it provides the support for mounting the upper reflector (e.g. the flat mirror), and it can also be critical in sealing in an inert gas to exclude moisture from the internal chamber formed by the cylindrical lens. As such, it is not always practical to design the 360 degree camera such that the cylindrical lens can be replaced by an end user since, for example, an end user would not be expected to have equipment to purge air from the camera and replace it with a moisture-free gas when replacing the cylindrical lens. Accordingly, an external protective housing assembly is desirable to protect the 360 degree camera, especially the cylindrical lens, when used in rugged environments where elements could scratch or otherwise damage the cylindrical lens. However, the introduction of another two optical layers (the gap and the transparent cylindrical housing member), without more, degrades the resulting images produced by the camera due to additional reflections created by the additional optical layers. The embodiments of the disclosure, however, have been found to greatly alleviate this problem by sealing the gap so that it can be filled with a transparent liquid, thereby reducing the difference in the index of refraction between the various boundaries of the cylindrical lens, gap, and transparent cylindrical housing member. As a result, the end user can buy a relatively inexpensive protective housing using a transparent cylindrical hosing member that can be replaceable and inexpensive while providing protection for the cylindrical lens and camera generally while minimizing if not eliminating undesirable reflections that would otherwise result with an air gap. Furthermore, by providing liquid between the cylindrical lens and the cylindrical housing element, the effect of small optical defects that can occur on the outer or inner surface of the cylindrical lens (e.g. scratches) from usage, manufacturing process or otherwise are substantially reduced.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A housing assembly for a panoramic camera, comprising:
   a transparent cylindrical housing member sized to accommodate a cylindrical lens of the panoramic camera with a concentric gap between an inner surface of the transparent cylindrical housing member and an outer surface of the cylindrical lens, wherein the concentric gap has a consistent gap width between the inner surface of the transparent cylindrical housing member and the outer surface of the cylindrical lens;
   a bottom sealing member that forms a seal between a bottom of the transparent cylindrical housing member and a bottom of the cylindrical lens; and
   a top sealing member that forms a seal between a top of the transparent cylindrical housing member and a top of the cylindrical lens;
   wherein the transparent cylindrical housing member, bottom sealing member, and top sealing member are removable.

2. The housing assembly of claim 1, further comprising a base into which a base of the panoramic camera is held when the panoramic camera is removably mounted in the housing assembly.

3. The housing assembly of claim 1, further comprising an adjustable compression ring that adjust pressure on the bottom sealing member to form the seal between the bottom of the transparent cylindrical housing member and the bottom of the cylindrical lens.

4. The housing assembly of claim 3, wherein the adjustable compression ring is threaded, and wherein turning the adjustable compression ring around the threads adjusts the pressure on the bottom sealing member.

5. The housing assembly of claim 1, further comprising a top member that removably engages the top of the transparent cylindrical housing member and the top sealing member, thereby applying pressure on the top sealing member to form the seal between the top of the transparent cylindrical housing member and the top of the cylindrical lens.

6. The housing assembly of claim 1, further comprising a transparent liquid disposed in the gap between the inner surface of the transparent cylindrical housing member and the outer surface of the cylindrical lens.

7. The housing assembly of claim 6, wherein the liquid is colored.

8. The housing assembly of claim 6, wherein the liquid contains optically significant matter suspending the transparent liquid.

9. A protective container for a panoramic camera having a single image sensor that receives light from a panoramic reflector arrangement that is disposed in a substantially cylindrical lens, the protective container comprising:
   a base portion having a cavity for accommodating a base of the panoramic camera;
   a transparent cylindrical housing member sized to accommodate the cylindrical lens of the panoramic camera within the transparent cylindrical housing member with a concentric gap between an inner surface of the transparent cylindrical housing member and an outer surface of the cylindrical lens, wherein the concentric gap has a consistent gap width between the inner surface of the transparent cylindrical housing member and the outer surface of the cylindrical lens;
   a bottom O-ring that forms a seal between a bottom of the transparent cylindrical housing member and a bottom of the cylindrical lens;
   an annular compression ring that is threaded to engage corresponding threads on the base portion, and which compresses the bottom O-ring to form the seal between the bottom of the transparent cylindrical housing member and the bottom of the cylindrical lens and between the base portion and the base of the panoramic camera; and
   a top portion that fits onto a top of the transparent cylindrical housing member and forms a seal between the top of the transparent cylindrical housing member and a top of the cylindrical lens.

10. The protective container of claim 9, wherein the top portion comprises a top O-ring to form the seal between the top of the transparent cylindrical housing member and the top of the cylindrical lens.

11. The protective container of claim 9, wherein an upper level of the annular compression ring is below a viewable level of the panoramic camera when in place to form the seal between the bottom of the transparent cylindrical housing member and the bottom of the cylindrical lens and between the base portion and the base of the panoramic camera.

12. The protective container of claim 9, wherein a diameter of the transparent cylindrical housing member tapers inward towards the bottom of the transparent cylindrical housing member in correspondence with an inward taper of a diameter of the cylindrical lens of the panoramic camera.

13. The protective container of claim 9, wherein the width of the gap between the tops and bottoms of the transparent cylindrical housing member and the cylindrical lens is substantially consistent.

14. The protective container of claim 9, wherein the gap between the transparent cylindrical housing member and the cylindrical lens of the panoramic camera is filled with a transparent liquid.

15. The protective container of claim 14, wherein the transparent liquid is colored.

16. The protective container of claim 14, wherein the transparent liquid contains optically significant matter suspended in the liquid.

17. The protective container of claim 9, wherein the protective housing seals the panoramic camera in the protective housing and the panoramic camera is controlled wirelessly.

18. A method of forming a protective container for a panoramic camera, comprising:
   forming a base portion having a cavity for accommodating a base of the panoramic camera;
   forming a transparent cylindrical housing member sized to accommodate a cylindrical lens of the panoramic camera within the transparent cylindrical housing member with a concentric gap between an inner surface of the transparent cylindrical housing member and an outer surface of the cylindrical lens, wherein the concentric gap has a consistent gap width between the inner surface of the transparent cylindrical housing member and the outer surface of the cylindrical lens;
   forming a bottom O-ring that forms a seal between a bottom of the transparent cylindrical housing member and a bottom of the cylindrical lens;
   forming an annular compression ring that is threaded to engage corresponding threads on the base portion, and which compresses the bottom O-ring to form the seal between the bottom of the transparent cylindrical housing member and the bottom of the cylindrical lens and between the base portion and the base of the panoramic camera; and
   forming a top portion that fits onto a top of the transparent cylindrical housing member and forms a seal between the top of the transparent cylindrical housing member and a top of the cylindrical lens.

19. The method of claim 18, further comprising filling the concentric gap with a transparent liquid.

20. The method of claim 19, wherein filling the concentric gap with a transparent liquid comprises filling the concentric gap with a transparent liquid that is at least one of a colored liquid or a liquid containing optically significant matter suspended in the liquid.

\* \* \* \* \*